(12) United States Patent
Brenn et al.

(10) Patent No.: US 12,168,431 B2
(45) Date of Patent: Dec. 17, 2024

(54) BRAKE SYSTEM FOR A MOTOR VEHICLE

(71) Applicant: Continental Teves AG & Co. OHG, Frankfurt am Main (DE)

(72) Inventors: Martin Brenn, Mainz (DE); Jürgen Böhm, Oberneisen (DE); Sascha Gröger, Idstein (DE); Sebastian Müller, Hettingen (DE); Jochen Beuss, Erzhausen (DE); Anselm Keil, Hofheim (DE); Marco Besier, Bad Schwalbach (DE); Matthias Muntu, Hofheim (DE); Timo Sauerwald, Herborn (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 302 days.

(21) Appl. No.: 17/770,876

(22) PCT Filed: Oct. 19, 2020

(86) PCT No.: PCT/EP2020/079331
§ 371 (c)(1),
(2) Date: Apr. 21, 2022

(87) PCT Pub. No.: WO2021/078673
PCT Pub. Date: Apr. 29, 2021

(65) Prior Publication Data
US 2022/0371561 A1    Nov. 24, 2022

(30) Foreign Application Priority Data
Oct. 22, 2019   (DE) .................... 10 2019 216 234.7

(51) Int. Cl.
*B60T 8/88*  (2006.01)
*B60T 7/12*  (2006.01)
*B60T 8/96*  (2006.01)

(52) U.S. Cl.
CPC ............. *B60T 8/885* (2013.01); *B60T 7/12* (2013.01); *B60T 8/96* (2013.01); *B60T 2240/00* (2013.01);
(Continued)

(58) Field of Classification Search
CPC ... B60T 8/885; B60T 8/88; B60T 8/96; B60T 7/12; B60T 2240/00; B60T 2270/402; B60T 2270/404; B60T 2270/413; B60T 2270/82
See application file for complete search history.

(56) References Cited

U.S. PATENT DOCUMENTS 6,345,225 B1    2/2002  Bohm et al.
6,476,515 B1 *  11/2002 Yamamoto .............. B60T 7/042
                                                    307/9.1
(Continued)

FOREIGN PATENT DOCUMENTS

CN    201800701 U     4/2011
CN    105960361 A     9/2016
(Continued)

OTHER PUBLICATIONS

Korean Office Action dated Aug. 30, 2023 for the counterpart Korean Patent Application No. 10-2022-7011180 and Global Dossier translation of same.
(Continued)

*Primary Examiner* — Jacob M Amick (57) ABSTRACT

A brake system for a motor vehicle has electromechanical wheel brakes, a brake operating unit and a central brake control unit. The wheel brakes each have a local brake control unit. The central brake control unit is connected to the brake operating unit and the local brake control units via a first data connection. The brake operating unit is connected to the local brake control unit of at least one wheel brake via
(Continued)

a second data connection. In a normal operating mode the central brake control unit determines at least one brake demand from first operating information, received via the first data connection and transmits control signals corresponding to the brake demand to the local brake control units. In a fallback operating mode the local brake control units actuate the respective wheel brakes basis on second operating information, received via the second data connection.

17 Claims, 4 Drawing Sheets

(52) U.S. Cl.
CPC ... *B60T 2270/402* (2013.01); *B60T 2270/404* (2013.01); *B60T 2270/413* (2013.01); *B60T 2270/82* (2013.01)

(56) References Cited

U.S. PATENT DOCUMENTS

| | | |
|---|---|---|
| 2008/0054716 A1 | 3/2008 | Sato et al. |
| 2009/0189441 A1 | 7/2009 | Degoul |
| 2011/0155521 A1 | 6/2011 | Thibault et al. |
| 2016/0339888 A1 | 11/2016 | Yokoyama et al. |
| 2019/0152459 A1 | 5/2019 | Dieckmann et al. |
| 2022/0371561 A1 | 11/2022 | Brenn et al. |
| 2023/0242085 A1 | 8/2023 | Beuss |

FOREIGN PATENT DOCUMENTS

| | | |
|---|---|---|
| CN | 108883755 A | 11/2018 |
| DE | 10043189 A1 | 3/2001 |
| DE | 102007040829 A1 | 3/2008 |
| DE | 102007001371 A1 | 7/2008 |
| DE | 102017210072 A1 | 12/2018 |
| DE | 102020213130 A1 | 4/2021 |
| DE | 102020204221 A1 | 10/2021 |
| JP | 2001138882 A | 5/2001 |
| JP | 2001523619 A | 11/2001 |
| JP | 2008055992 A | 3/2008 |
| JP | 2011131879 A | 7/2011 |
| JP | 2018172031 A | 11/2018 |
| WO | 9926821 A1 | 6/1999 |
| WO | 9926822 A1 | 6/1999 |

OTHER PUBLICATIONS

Chinese Second Office Action dated Sep. 29, 2023 for the counterpart Chinese Patent Application No. 202080073632.4 and DeepL translation of same.
Korean Written Opinion dated Oct. 25, 2023 for the counterpart Korean Patent Application No. 10-2022-7011180 and Global Dossier translation of same.
The International Search Report and the Written Opinion of the International Searching Authority mailed on Jan. 21, 2021 for the counterpart PCT Application No. PCT/EP2020/079331.
Chinese Office Action dated Apr. 15, 2023 for the counterpart Chinese Patent Application No. 202080073632.4.
Japanese Notice of Reasons for Refusal dated Apr. 17, 2023 for the counterpart Japanese Patent Application No. 2022-520921.
Notice of Allowance dated Mar. 28, 2024 of the counterpart EP application No. 20796521.1.
Korean Second Office Action dated Jun. 25, 2024 for the counterpart Korean Patent Application No. 10-2022-7011180 and Global Dossier translation of same.

* cited by examiner

BRAKE SYSTEM FOR A MOTOR VEHICLE

CROSS-REFERENCE TO RELATED APPLICATIONS

This U.S. patent application claims the benefit of PCT patent application No. PCT/EP2020/079331, filed Oct. 19, 2020, which claims the benefit of German patent application No. 10 2019 216 234.7, filed Oct. 22, 2019, both of which are hereby incorporated by reference.

TECHNICAL FIELD

The invention relates to a brake system for a motor vehicle.

BACKGROUND

In electromechanical brakes, a mechanical feedthrough of a brake pedal to the wheel brakes in order to generate a braking torque even in the event of failure of an electrically controlled brake force booster and/or distribution is no longer provided. Rather, a mechanical decoupling of the mechanical feedthrough from a brake pedal to the wheel brakes takes place.

Consequently, direct use of the driver's muscle power to generate a braking torque, as is provided in a fallback level operating mode of an electrohydraulic brake system, is no longer possible. Accordingly, control of the applied braking torque in a fallback level, that is to say, for example, in the event of failure of the central electrical controller of the wheel brakes, is no longer possible with this arrangement.

SUMMARY

In a first aspect, a brake system for a motor vehicle has electromechanical wheel brakes, a brake operating unit and a central brake control unit, wherein the wheel brakes each have a local brake control unit, and wherein the central brake control unit is directly connected to the brake operating unit and to the local brake control units of the wheel brakes via a first data connection. The brake operating unit is directly connected to the local brake control unit of at least one wheel brake via a second data connection. The central brake control unit, in a normal operating mode of the brake system, is configured to determine at least one brake demand from first operating information, received via the first data connection, of the brake operating unit and to transmit control signals corresponding to the brake demand to the local brake control units of the wheel brakes. The local brake control units of the wheel brakes, in a fallback level operating mode of the brake system, are configured to actuate the respective wheel brakes on the basis of second operating information, received via the second data connection, of the brake operating unit.

In one embodiment a "direct" connection may be understood as being a connection between two elements in which no further elements are arranged in the connection between the elements. For example, it is provided that the central brake control unit is provided as the central point of a radial connection, so that the central brake control unit is directly connected, that is to say immediately connected, to the brake operating unit, the local brake control units and/or further elements of the brake system. The individual connections of this radial connection then form a first data connection. A "data connection" may also comprise a plurality of individual connections which in total establish a data connection between a plurality of elements of the brake system.

However, faults could occur in technical systems and a loss of braking ability would lead to dangerous situations. Therefore, elements of the brake system may be designed redundantly. Thus, in a fallback level operating mode of the brake system, for example in the event of failure of the central brake control unit, operating information acquired by the brake operating device can still be implemented by the wheel brakes.

The redundancy is so chosen that the number of duplicated elements and data connections is minimal, so that the additional costs caused by the redundant design in the production of the brake system are minimal.

It may be provided that the central brake control unit is connected to each of the local brake control units of the wheel brakes of a vehicle axle via a shared data connection.

According to one embodiment, the first operating information contains a degree of operation of the brake operating unit, for example an operating angle, an operating travel or an operating force, or the brake demand itself. Direct transmission of the brake demand as the operating information may be provided, for example, for automated driving functions, since no mechanical data of a brake pedal are necessary here, but rather information about a deceleration to be applied can be provided by a driving function. The designation "operating information" accordingly may not only refer to the operation of a brake pedal but and/or to operation of the brake itself.

Analogously hereto, it is provided according to a further embodiment that the second operating information may also contain a degree of operation of the brake operating unit, for example an operating angle, an operating travel or an operating force, and/or the brake demand itself.

According to a further embodiment the brake operating unit may be directly connected to the local brake control unit of exactly one wheel brake, wherein the local brake control unit directly connected to the brake operating unit is configured to transmit second operating information received from the brake operating unit to the local brake control units of the further wheel brakes via a third data connection. In this case, the local brake control units of the further wheel brakes may be each connected to not more than two further local brake control units of the wheel brakes via the third data connection. In this case, it can be provided for example that the third data connection connects only the local brake control units of the wheel brakes. In this case, the third data connection may for example form a ring structure which links the local brake control units together.

According to one embodiment, the local brake control units of the wheel brakes are configured to exchange the second operating information and/or determined wheel speed information with each other via the third data connection.

According to a further embodiment that the electromechanical wheel brakes each have an electromechanical actuator, wherein the local brake control units are configured to actuate the respective electromechanical actuator in order to generate a braking torque.

According to a further embodiment, it is provided that the local brake control units of the wheel brakes are each connected to wheel speed sensors of the wheels associated with the wheel brakes for the transmission of information. In this case, it can further be provided that the local brake control units are configured to transmit wheel speed information of the respective wheel speed sensors to the central brake control unit via the first data connection.

The central brake control unit in a normal operating mode is then for example configured to determine the control signals for the local brake control units of the wheel brakes on the basis of the wheel speed information of the wheels and the first operating information of the brake operating unit. Thus, for example, anti-lock control for the wheel brakes can be implemented centrally. It can further be provided that the local brake control units are configured to carry out a brake control function, for example anti-lock control, on the basis of wheel speed information received from the wheel speed sensors.

Furthermore, it is provided according to a further embodiment that the local brake control units are configured to ignore information received via the second or the third data connection until a failure of the central brake control unit has been detected, so that erroneous actuation is avoided.

According to a further embodiment, it is provided that the first operating information is determined independently of the second operating information. This can be achieved for example by the first operating information being determined by at least a first sensor assembly of the brake operating unit and the second operating information being determined by at least a second sensor assembly of the brake operating unit. In this case, it is provided according to one embodiment that the physical quantity from which the first sensor assembly determines the first operating information is different from the physical quantity from which the second sensor assembly determines the second operating information. The reliability of the brake system can thereby be improved, since operating information may be determined in ways that are independent of each other, so that failure of one type of detection, for example as a result of a sensor fault, does not necessarily lead to complete failure of the acquisition of the operating information.

It is provided according to a further embodiment that the brake operating unit has at least two signal outputs, wherein a first signal output is connected to the first data connection and a second signal output is connected to the second data connection. The signal outputs may be electrically isolated from one another, so that failure of one of the signal outputs does not affect the other signal output.

According to a further embodiment, it is provided that the central brake control unit is connected to a vehicle bus, wherein brake demands received from the vehicle bus are taken into account by the central brake control unit in the determination of the control signals for the local brake control units. Additional information can thereby be taken into account in the determination of the control signal.

According to a further embodiment, it is provided that at least one local brake control unit is connected directly to the vehicle bus. In this case, it can be provided for example that the local brake control units of the wheel brakes are configured to exchange a brake demand received by the vehicle bus with each other via the third data connection, so that the information from the vehicle bus is communicated via a ring line formed by the third data connection.

It is provided according to a further embodiment that the brake system has a primary power supply and a secondary power supply which is independent of the primary power supply. In this case, it may be that the primary power supply is configured to supply power to the first sensor assembly of the brake operating unit, to the central brake control unit and to a first subset of the wheel brakes, while the secondary power supply is configured to supply power to the second sensor assembly of the brake operating unit and to a second subset of the wheel brakes which is different from the first subset. The supply of power to the wheel brakes can be divided either axle-wise or diagonally, so that the first subset of the wheel brakes is the wheel brakes of a first vehicle axle and the second subset of the wheel brakes is the wheel brakes of a second vehicle axle.

According to a further embodiment, it is provided that at least one subset of the wheel brakes, for example the wheel brakes of a rear axle of the vehicle, is configured to implement a parking brake function, wherein in the fallback level operating mode the local brake control units are configured to activate a parking brake function when it has been detected that a driver is leaving the motor vehicle, an ignition of the motor vehicle has been deactivated and/or a second parking brake operating device has been activated. It can further be provided that the brake system has at least one parking brake operating device, wherein the parking brake operating device is connected to the central brake control unit and is configured to transmit parking brake information to the central brake control unit on operation of the parking brake operating device, wherein the central brake control unit may be configured to actuate the wheel brakes in order to activate a parking brake function when the parking brake information has been received from the parking brake operating device.

According to a further embodiment, it is provided that the central brake control unit in the normal operating mode determines from the determined brake demand braking torques and/or clamping forces to be applied by each of the wheel brakes, wherein the control signals transmitted to the local brake control units contain the determined braking torques and/or clamping forces for the wheel brake associated with each local brake control unit. In one embodiment a "clamping force" may be understood as being the force with which the friction partners of a wheel brake are pressed against each other. Furthermore, in one embodiment a "braking torque" may be understood as being a torque which is applied to a vehicle wheel by the wheel brake and which acts contrary to the direction of rotation of the vehicle wheel. In one embodiment, processing of a brake demand is accordingly effected by the central brake control unit up to the point at which the forces actually to be generated by the wheel brakes are determined. In this case, a distribution of the brake forces between the wheel brakes provided to achieve the desired deceleration is may also be taken into account by the central brake control unit. A "brake force" may in turn be understood as being the force which acts between the vehicle wheel and the road and leads to a deceleration of the vehicle.

Alternatively, to the above-described processing of a brake demand by the central brake control unit, it is provided according to a further embodiment that the central brake control unit in the normal operating mode determines from the determined brake demand a desired deceleration of the motor vehicle that is to be applied by the wheel brakes, wherein the control signals transmitted to the local brake control units contain the determined desired deceleration of the motor vehicle. The local brake control units are then configured to determine a braking torque to be applied by the respective associated wheel brake and/or a clamping force for implementing the desired deceleration of the motor vehicle. In this case, a brake force distribution function for dividing the brake forces between the wheel brakes in each case is taken into account by the local brake control units of the wheel brakes in the determination of the braking torques and/or clamping forces to be applied. Accordingly, in this embodiment, the central brake control unit only determines information about the desired deceleration of the vehicle, which may then be processed further by the local brake control units.

According to a further embodiment, it is provided that the local brake control units in the fallback level operating mode may be configured to determine from the second operating information a braking torque to be applied by the wheel brake associated with the respective local brake control unit and/or a clamping force to be applied by the wheel brake associated with the respective local brake control unit.

It is further provided according to another embodiment that a predefined distribution of a braking force necessary for implementing a brake demand between the wheel brakes is taken into account in the determination of the braking torque to be applied and/or of the clamping force to be applied. Again, a "brake force" may be understood as being the force which acts between the vehicle wheel and the road and leads to a deceleration of the vehicle. Thus, it can be provided, for example, that the wheel brakes of a front axle of the vehicle are in principle to apply a higher brake force than the wheel brakes of a rear axle of the vehicle. For example, the distribution can be determined such that a fixed proportion of the brake force required for implementing the brake demand is provided by the wheel brakes of the rear axle or front axle. For example, it can be provided that 20% of the required brake force is provided by the wheel brakes of the rear axle, while the wheel brakes of the front axle provide the remaining 80% of the brake force.

Thus, even in the absence of coordination of a deceleration by a central brake control unit, efficient utilization of the possible deceleration capability of the vehicle can be ensured by avoiding overbraking of the vehicle axles. The distribution of the brake force can depend on vehicle parameters, such as, for example, the vehicle weight, the wheel base of the vehicle, the position of the center of gravity of the vehicle and/or the like.

Furthermore, it can also be provided that the distribution of the brake forces may depend on the speed of the vehicle, a steering angle and/or the intensity of a brake demand. Thus, for example in the case of pronounced deceleration when cornering at high speeds, it is important to avoid overbraking of the rear axle, since this could lead to the rear end of the vehicle breaking loose.

The distribution of the braking torques to be applied between the wheel brakes may be further dependent on the magnitude of the brake demand. Thus, as the magnitude of the brake demand increases, it is expedient to shift the braking power to the front axle of the vehicle on account of the dynamic wheel load distribution on vehicle deceleration.

The driving stability of the vehicle during deceleration is improved according to a further embodiment in that, when the failure of at least one of the local brake control units is detected, an increase in the desired deceleration of the motor vehicle and/or an increase in the braking torques and/or clamping forces applied by the wheel brakes is limited to a specific gradient. In this case, limiting of the increase may be controlled both by the local brake control units of the wheel brakes and by the central brake control unit. Limiting the increase in the braking torques of the wheel brakes to a defined gradient makes it possible to prevent a yawing moment of the vehicle which can no longer be controlled by the driver of the vehicle from being generated as a result of a deceleration acting asymmetrically in the vehicle.

In this case, it is further provided according to an embodiment that the gradient is dependent on the position in the motor vehicle of the wheel brake associated with the failed local brake control unit. Thus, in the event of failure of a wheel brake on a front wheel of the vehicle, for example, the gradient necessary to reduce the yawing moment of the vehicle to a manageable level on deceleration is smaller compared to a failure of a wheel brake on a rear wheel of the vehicle. For this purpose, it can be provided for example that information about the operating status of the local brake control units is exchanged both between the local brake control units via the third data connection and between the local brake control units and the central brake control unit via the second data connection. Thus, the gradient may be purposely set in the event of failure of a local brake control unit of a wheel brake both in the normal operating mode and in the fallback level operating mode.

According to the embodiments, the architecture described hereinbelow is implemented. On each wheel or in each wheel brake there are arranged a local brake control unit (WCU) and an electromechanical actuator which is responsible for generating a wheel force or a braking/wheel torque. These local brake control units may be connected in a radial arrangement to a central brake control unit, which distributes the brake demands to the local brake control units on the basis of a vehicle request, a pilot (Parkpilot, automatic cruise control, automated driving) request or a function request (active yaw control, traction control system).

The central brake control unit reads in the first signal output of a brake operating unit, that is to say the corresponding sensors of an electronic brake pedal (e-Pedal), and determines a DBR request (drive brake request). This communication takes place with the raw sensor information of the underlying sensor and is processed, that is to say converted into a brake demand, by the central brake control unit.

Alternatively, communication between the brake operating unit and the central brake control unit can take place using the serial communication (CAN, Flexray, Ethernet) of the vehicle network. In this case, the serial communication channel may be understood as being part of the first data connection.

The central brake control unit is connected to a vehicle bus and can receive external demands, for example brake demands, therefrom. The brake operating unit transmits on the communication line (first data connection) the travel, the force or, directly, the driver request in the form of braking torque to the central brake control unit.

For a fallback level of the brake system, it is provided that the local brake control units of the wheel brakes are connected to the brake operating unit for example via a shared ring communication line formed by the second and third data connections in a second channel. The brake operating unit transmits on this communication line the travel, the force or, directly, the driver request which has been determined by independent sensors for example in a different housing or sufficiently separate from the main path, that is to say the information that is transmitted to the central brake control unit for normal operating mode. This communication may take place using a bus (multipoint) communication (CAN, Flexray, Ethernet) of the vehicle network.

The local brake control units determine the driver brake request (brake demand) from the information relating to the path or force of the e-Pedal. The local brake control units generate the associated braking torque for the driver brake request decentrally from the driver brake request and optionally with the aid of the availability information of the other local brake control units. For automated driving, the ring line may also be connected to the redundant pilot, for example effected by the vehicle bus, to which brake requests can be transmitted directly.

According to embodiments, it can further be provided that the local brake control units perform a brake control function, for example ABS, directly. Furthermore, it can be provided that the local brake control units read in the wheel speed information of the wheel speed sensors of the wheel brakes directly and use it to control the braking torque.

Furthermore, it can be provided that the radial line (first data connection) is not a connection from the central brake control unit to the local brake control units but rather a connection from the central brake control unit to all the local brake control units of an axle. Furthermore, the central brake control unit can be integrated in the general chassis controller.

The possible connections between the central brake control unit (master) and the local brake control units (WCU) and with a vehicle bus (vehicle) are shown again hereinbelow in table form:

Radial Line:

|      | Master | WCU FL | WCU FR | WCU RL | WCU RR | Vehicle |
|------|--------|--------|--------|--------|--------|---------|
| Ch 1 | X      | X      |        |        |        |         |
| Ch 2 | X      |        | X      |        |        |         |
| Ch 3 | X      |        |        | X      |        |         |
| Ch 4 | X      |        |        |        | X      |         |
| Ch 5 | X      |        |        |        |        | X       |

Modified:

|      | Master | WCU FL | WCU FR | WCU RL | WCU RR | Vehicle |
|------|--------|--------|--------|--------|--------|---------|
| Ch 1 | X      | X      | X      |        |        |         |
| Ch 3 | X      |        |        | X      | X      |         |
| Ch 5 | X      |        |        |        |        | X       |

A connection provided between a channel of the central brake control unit and a further element is thereby indicated by an "X".

With regard to the power supply, that is to say the supply of power to the elements of the brake system, it is provided according to one embodiment that the central brake control unit, a sensor path (first sensor assembly) of the brake operating unit and two of the wheel brakes (diagonally or front or rear), or the local brake control units thereof, are supplied by a primary on-board power supply (primary power supply). The two other wheel brakes (diagonally or front or rear), or the local brake control units thereof, and the second sensor path (second sensor assembly) of the brake operating unit are supplied by the secondary on-board power supply (secondary power supply).

With regard to the actuation of the wheel brakes for implementation of a parking brake function, it is provided according to a further embodiment that the EPB switch (parking brake operating device) is itself connected to the central brake control unit. The central brake control unit determines and distributes the actuation demands (parking brake information) of the parking brake to the local brake control units which are configured to implement a parking brake function.

In a fallback level operating mode, it can further be provided that the on-board power supply of the vehicle determines the request for operation of the electronic parking brake via "driver left", "ignition off", a second switch or other input possibilities and transmits it directly on the ring line (second data connection).

In this case, it can be provided that the local brake control units contain an option that information on the ring line (second data connection) is ignored until a failure of the central brake control unit has been detected, for example via timeout of the communication or an explicit log off.

BRIEF DESCRIPTION OF THE DRAWINGS

The present disclosure will become more fully understood from the detailed description and the accompanying drawings, wherein.

DETAILED DESCRIPTION

In the following text, features that are similar or identical are denoted by the same reference signs.

Figure 1:
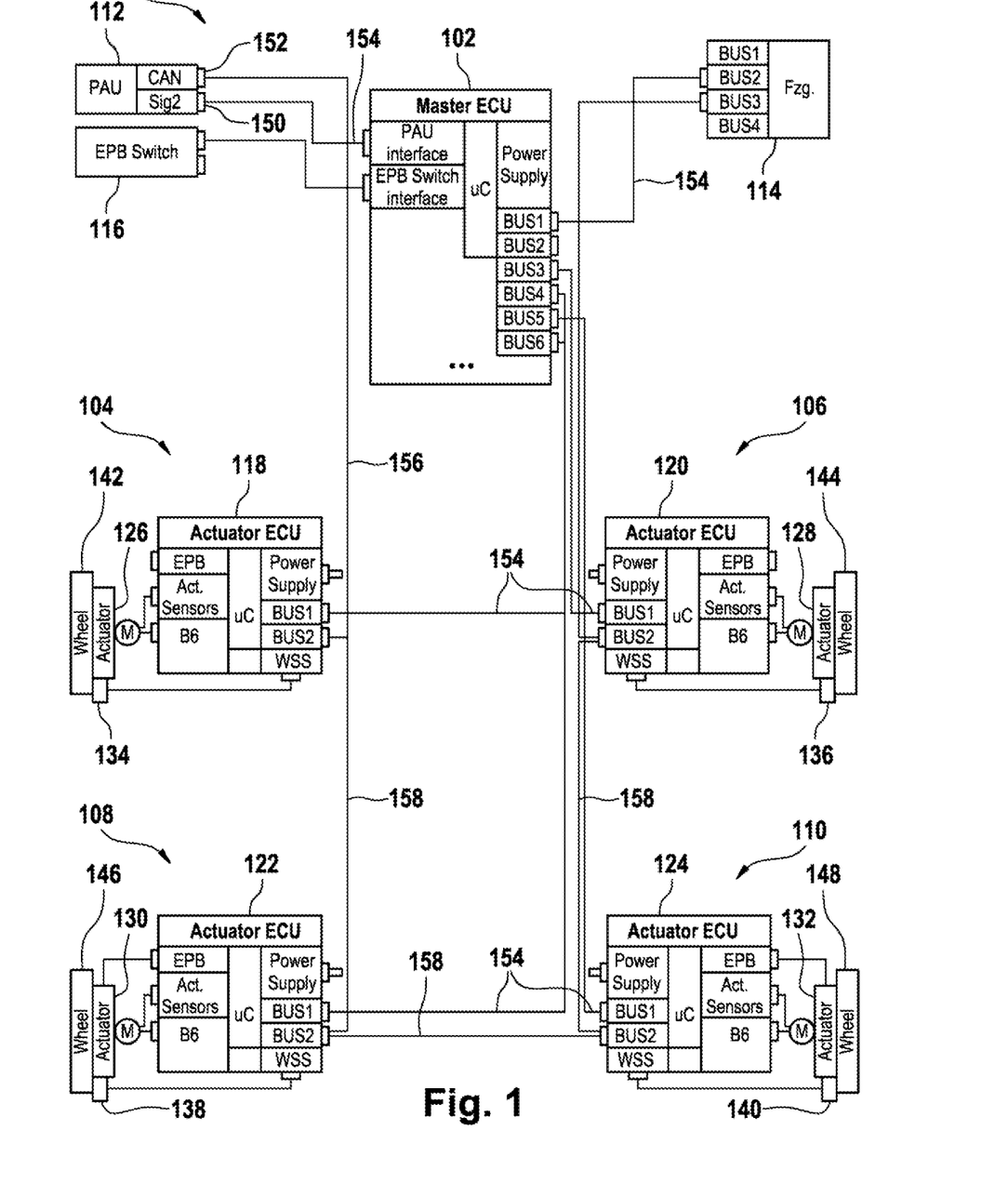
FIG. 1 is a schematic illustration of an exemplary brake system.

FIG. 1 shows a schematic illustration of a brake system 100 according to one embodiment. In this case, the brake system 100 has a central brake control unit 102, four electromechanical wheel brakes 104, 106, 108 and 110, a brake operating unit 112, a vehicle bus 114 and a parking brake operating device 116. The wheel brakes each have a local brake control unit 118, 120, 122, 124, an actuator 126, 128, 130, 132 and a wheel speed sensor 134, 136, 138, 140 and are associated with the vehicle wheels 142, 144, 146, 148.

The brake operating unit 112 may be in the form of a brake pedal with a wholly mechanical pedal feel simulator (e-Pedal).

The brake operating unit 112 has two independent signal outputs 150, 152, wherein first or second operating information, respectively, is provided via the signal outputs 150, 152 on operation of the brake operating unit 112 by a vehicle driver. The first operating information is determined by a first sensor assembly and the second operating information is determined by a second sensor assembly. The first and second sensor assemblies may be independent of each other and may determine the operating information on the basis of different physical quantities.

The first signal output 150 is connected via a first data connection 154 to the central brake control unit 102. Furthermore, the central brake control unit 102 is connected via the first data connection 154 directly to the local brake control units 118, 120, 122, 124 of the wheel brakes 104, 106, 108, 110, to the vehicle bus 114 and to the parking brake operating device 116. Brake demands, for example, can thereby be transmitted via the vehicle bus when the vehicle is in an autonomous or semi-autonomous driving mode. The first data connection 154 accordingly forms a radial connection at the center of which the central brake control unit 102 is arranged.

The central brake control unit 102 is configured to generate control signals for the brake control units 118, 120, 122, 124 of the wheel brakes 104, 106, 108, 110 on the basis of first operating information received from the brake operating unit 112 and on the basis of brake demands received from the vehicle bus 114 and to transmit these control signals to the brake control units 118, 120, 122, 124 via the first data connection. The brake control units 118, 120, 122, 124 are then configured to actuate the actuators 126, 128, 130, 132 in accordance with the received control signals so that a braking torque is effected at the wheels 142, 144, 146, 148. The wheel speeds of the wheels 142, 144, 146, 148 are thereby each monitored by the wheel speed sensors 134, 136, 138, 140 and corresponding wheel speed information is transmitted to the central brake control unit 102 via the first data connection 154. On the basis of the wheel speed information, and optionally taking account of further information, the central brake control unit 102 can implement brake control functions, such as, for example, anti-lock control.

If, on the basis of a corresponding operation of the parking brake operating device 116, which can be in the form of a button or switch, for example, in the form of a toggle switch, corresponding parking brake information is transmitted to the central brake control unit 102, the central brake control unit 102 actuates the wheel brakes 104, 106, 108, 110, or the brake control unit 118, 120, 122, 124 thereof, in such a manner that a corresponding parking brake function is implemented by the wheel brakes 104, 106, 108, 110.

The second signal output 152 of the brake operating device 112 is connected directly to the local brake control unit 118 of the wheel brake 104 via a second data connection 156. Thus, in a fallback level operating mode of the brake system 100, for example in the event of failure of the central brake control unit 102, operating information can be transmitted directly from the brake operating unit 112 to the local brake control unit 118 of the wheel brake 104. In this case, the local brake control unit 118 is configured to locally determine from the received operating information a brake demand and therefore a corresponding braking torque to be applied by the wheel brake 104, and to correspondingly actuate the actuator 126.

Furthermore, the local brake control unit 118 is configured to communicate the received operating information to the further local brake control units 122, 124 and 120 via a third data connection 158, so that a brake demand can also be locally determined there and the respective actuators 130, 128 and 132 can be correspondingly actuated. Furthermore, the local brake control units 118, 120, 122, 124 may be configured to perform a brake control function, such as, for example, anti-lock control, on the basis of the respective wheel speed information of the wheel speed sensors 134, 136, 138, 140. For this purpose, it can also be provided for example that the wheel speed information of the respective wheel speed sensors 134, 136, 138, 140 is exchanged between the local brake control units 118, 120, 122, 124.

Finally, the local brake control unit 120 is also connected to the vehicle bus 114, so that brake demands received by the vehicle bus 114 are taken into account by the local brake control unit 120 in the actuation of the actuator 128 for providing a braking torque. Furthermore, a brake demand received by the vehicle bus 114 is also exchanged between the local brake control units 118, 120, 122, 124 via the third data connection 158 and taken into account locally in the control of the wheel brakes 104, 106, 108, 110.

The third data connection 156 forms a ring connection in which the local brake control units 118, 120, 122, 124 are connected in series one behind the other, so that a local brake control unit is always connected to a maximum of two further brake control units via the third data connection 156.

In the fallback level operating mode of the brake system 100, and therefore in the event of failure of the central brake control unit 102, because the parking brake operating device 116 is connected only to the central brake control unit 102, parking brake information provided by the parking brake operating device 116 is no longer communicated to the local brake control units 118, 120, 122, 124. However, a parking brake function can still be implemented by the wheel brakes 104, 106, 108, 110 by accessing other vehicle information. For example, it can be provided that a parking brake function of the wheel brakes 104, 106, 108, 110 is activated automatically when the ignition of the vehicle is switched off or the driver leaves the vehicle. Such information can be transmitted, for example, via the vehicle bus 114 to the local brake control units 118, 120, 122, 124, so that the respective parking brake functions are activated automatically in these cases even in the absence of a separate parking brake demand by the central brake control unit 102.

The brake system may have two independent power supplies (not shown). A primary power supply may be configured to supply power to a first sensor assembly of the brake operating unit 112, to the central brake control unit 102 and to the wheel brakes 104 and 106, that is to say the wheel brakes of a front axle of the vehicle. A secondary power supply is accordingly configured to supply power to a second sensor assembly of the brake operating unit 112 and to the wheel brakes 108 and 110, that is to say the wheel brakes of a rear axle of the vehicle. Alternatively, the wheel brakes 108 and 110 of the rear axle can also be supplied with power together with the central brake control unit 102 by the primary power supply, while the wheel brakes 104 and 106 of the front axle are supplied with power by the secondary power supply.

Alternatively, it can also be provided that the primary power supply supplies power to a first sensor assembly of the brake operating unit 112, to the central brake control unit 102, to the wheel brake 104 and to the wheel brake 110, that is to say wheel brakes arranged diagonally, while the secondary power supply supplies power to a second sensor assembly of the brake operating unit 112 and to the wheel brakes 106 and 108. Furthermore, the primary power supply can also supply power to the wheel brakes 106 and 108 together with the central brake control unit 102, while the secondary power supply supplies power to the wheel brakes 104 and 110.

Figure 2:
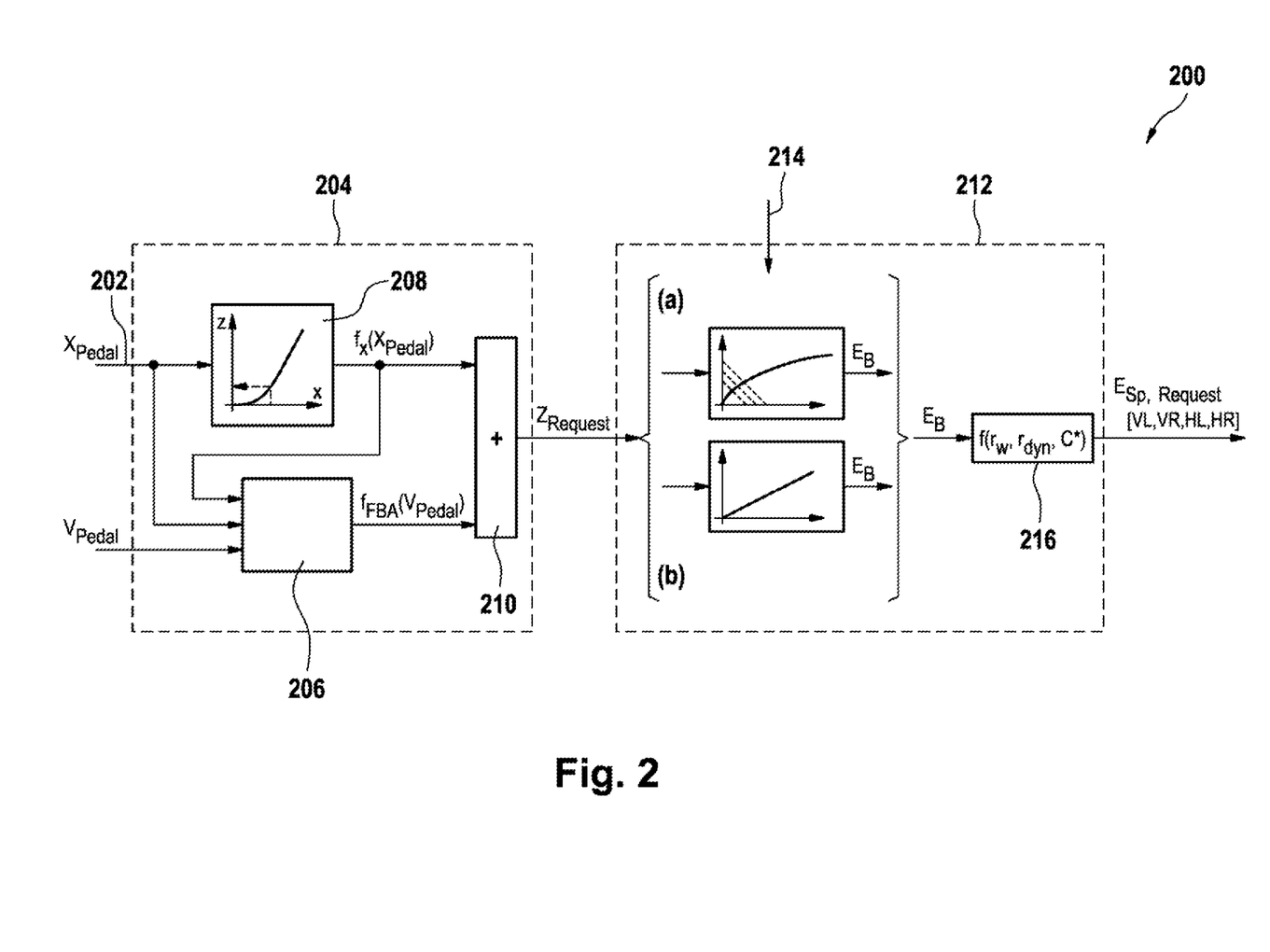
FIG. 2 shows an exemplary controller arrangement for the determination of control signals from first operating information by the central brake control unit in a normal operating mode.

FIG. 2 shows an exemplary controller arrangement 200 for the determination of control signals from first operating information by the central brake control unit 102 in a normal operating mode of the brake system 100 described hereinbefore. In this case, first operating information 202, in the case shown in the form of an operating travel $x_{Pedal}$ of the brake pedal of the brake operating unit 112, is acquired and fed to driver request acquisition 204. In addition to the operating travel $x_{Pedal}$, the speed of operation of the pedal $v_{Pedal}$ is further taken into account for the driver request acquisition 204 in the embodiment shown, which can indicate whether the brake demand is emergency braking, for example.

The speed of operation of the pedal $v_{Pedal}$ is thereby fed to a dynamic portion 206 of the driver request acquisition 204, while the operating travel $x_{Pedal}$ is fed both to the dynamic portion 206 and to direct evaluation of the operating travel 208. The direct evaluation of the operating travel 208 thereby allocates to an incoming operating travel $x_{Pedal}$ a function value $f_x(x_{Pedal})$, which in turn is fed to the dynamic portion 206.

The value $f_{FBA}(v_{Pedal})$ resulting from the dynamic portion 206 and the value $f_x(x_{Pedal})$ resulting from the direct evaluation of the operating travel 208 are then processed in function block 210 to a brake demand in the form of a vehicle deceleration request $Z_{Request}$, which is then fed to the determination of a brake force distribution 212. The vehicle deceleration request $Z_{Request}$ describes a desired deceleration of the vehicle to be effected by the wheel brakes 104, 106, 108 and 110.

In the determination of the brake force distribution 212, a distinction is made between two approaches, which are distinguished in FIG. 2 by a) and b). In the first case a), an ideal brake force distribution is applied to the brake force distribution from the determined vehicle deceleration request $Z_{Request}$ In order to determine the ideal brake force distribution, further vehicle data 214 are taken into account, such as, for example, the weight of the vehicle, the wheel base, the position of the center of gravity of the vehicle or the like. In this case, it can also be provided that the distribution of the brake force to be applied between the front axle and the rear axle of the vehicle is determined in dependence on the magnitude of the vehicle deceleration request $Z_{Request}$. In this case, it can be provided that, as the magnitude of the vehicle deceleration request $Z_{Request}$ increases, an increasing proportion of the vehicle deceleration is implemented by the wheel brakes 104 and 106 of the front axle of the vehicle. Thus, the deceleration capability of the wheel brakes can be utilized optimally taking account of the dynamic wheel load distribution. By contrast, in the second case b), a fixedly predefined brake force distribution between the front axle and the rear axle of the vehicle is applied.

From the values so determined of the brake forces required to implement the vehicle deceleration request $Z_{Request}$ according to FB of the brake force distribution, the clamping forces $F_{Sp,Request}$ [VL,VR,HL,HR] to be applied by the wheel brakes 104, 106, 108 and 110 are then determined in function block 216 and transmitted as control information to the local brake control units 118, 120, 122 and 124 of the wheel brakes 104, 106, 108 and 110. Alternatively, here and in the further considerations, there can be specified instead of a desired value for the clamping force also a desired value for the braking torque at the wheels. This is also dependent on which physical quantity is to be or can be set by the electromechanical wheel brakes 104, 106, 108, 110.

Alternatively, it can further also already be provided in the normal operating mode that the determination of the brake force distribution 212 takes place at the local brake control units 118, 120, 122 and 124, so that the central control unit 102 determines only the vehicle deceleration request $Z_{Request}$ and transmits it as control information to the local brake control units 118, 120, 122 and 124 via the first data connection 154.

Figure 3:
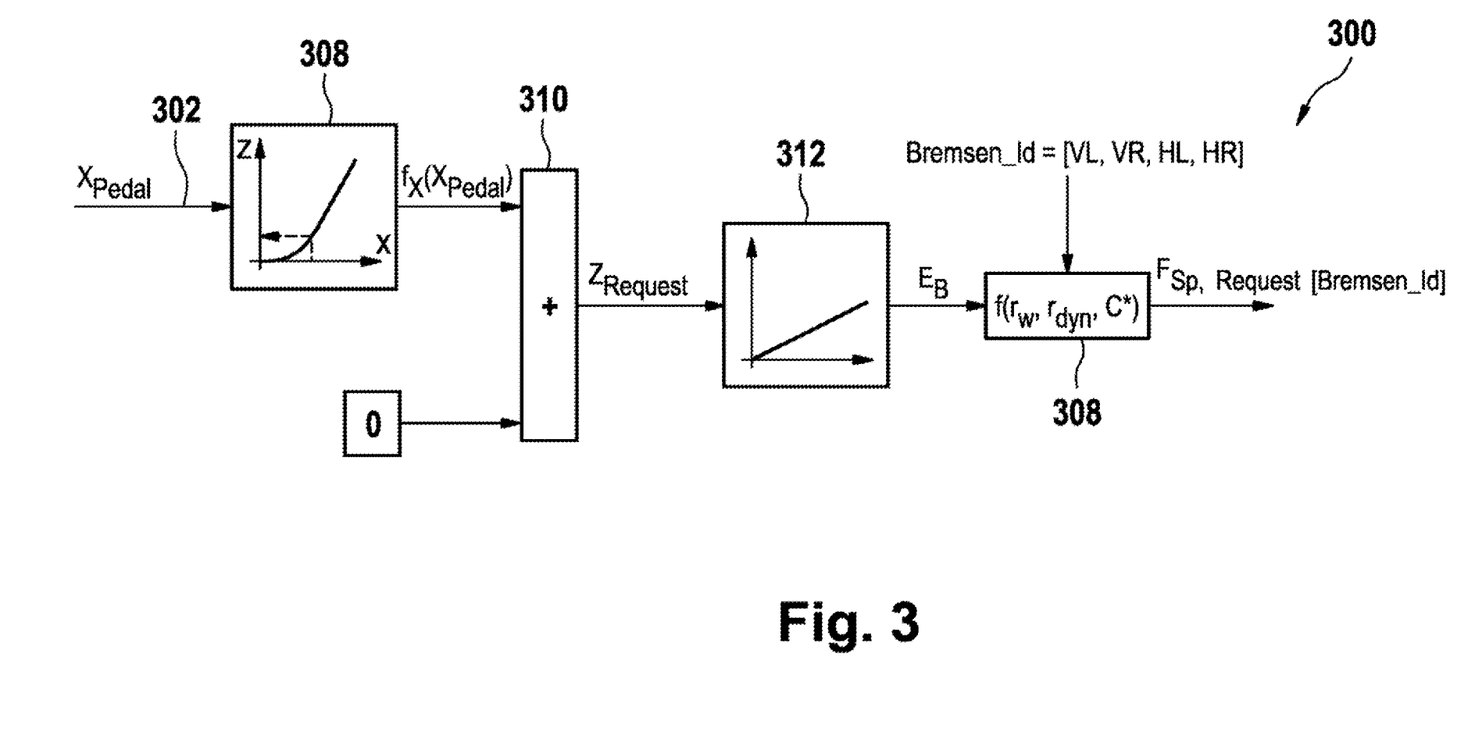
FIG. 3 shows an exemplary controller arrangement for the determination of clamping forces from second operating information by the local brake control units in a fallback level operating mode.

FIG. 3 shows an exemplary controller arrangement 300 for the determination of clamping forces from second operating information by the local brake control units 118, 120, 122 and 124 in a fallback level operating mode. In this case, it is provided that the local brake control units 118, 120, 122 and 124 receive the second operating information 302 directly via the second data connection 156 and the third data connection 158 in the form of an operating travel $x_{Pedal}$ of the brake pedal of the brake operating unit 112. Instead of an operating travel $x_{Pedal}$, an operating angle or an operating force can for example also be provided as the second operating information 302, which is determined physically independently of the operating travel $x_{Pedal}$.

The second operating information is again fed to direct evaluation of the operating travel 308, from which there is determined a value $f_x(x_{Pedal})$ which is dependent on the operating travel $x_{Pedal}$, or on an alternative quantity. The dynamic portion 206 described herein with reference to FIG. 2 is deactivated in the embodiment illustrated here. From the value $f_x(x_{Pedal})$, the vehicle deceleration request $Z_{Request}$ is again determined in function block 310 and fed to determination of the brake force FB to be applied in block 312. In this case, a fixedly predefined brake force distribution between the front axle and the rear axle that is not dependent on the magnitude of the vehicle deceleration request $Z_{Request}$ is applied. Finally, a desired value for the clamping force $F_{Sp,Request}$ [Bremsen_id] to be applied by the respective wheel brake 104, 106, 108 or 110 is determined in block 314 by the local brake control units 118, 120, 122 and 124, wherein Bremsen_id identifies the position of the wheel brake 104, 106, 108 or 110 in question in the vehicle (VL, VR, HL, HR). This information is then used to actuate the respective actuators 126, 128, 130 and 132.

Figure 4:
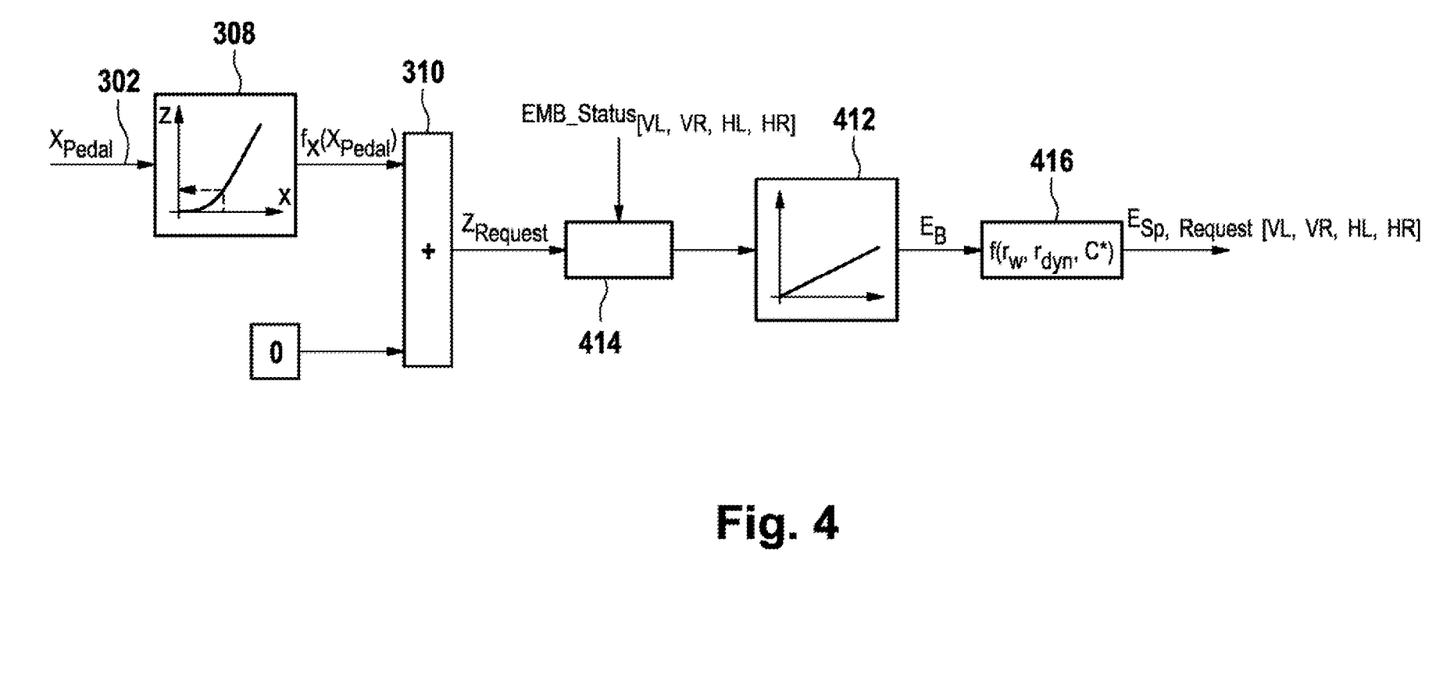
FIG. 4 shows an exemplary controller arrangement for the determination of control signals or clamping forces from operating information in the event of failure of a local brake control unit.

Finally, FIG. 4 shows an exemplary controller arrangement 400 for the determination of control signals or clamping forces from operating information in the event of failure of a local brake control unit 118, 120, 122 or 124. Up to and including the determination of the vehicle deceleration request $Z_{Request}$, the arrangement of FIG. 4 does not differ from the arrangement of FIG. 3, so that the corresponding description is applicable to the arrangement of FIG. 4.

However, in the arrangement of FIG. 4, the vehicle deceleration request $Z_{Request}$ is not fed directly to a determination of the brake force to be applied 412. Rather, the determined vehicle deceleration request $Z_{Request}$ is fed to an increase limiting function 414, wherein the increase limiting function 414 takes account of the status EMB_Status [VL, VR, HL, HR] of the local brake control units 118, 120, 122 and 124 as additional information. The increase limiting function 414 thereby limits the increase in the vehicle deceleration request $Z_{Request}$, and therefore in the braking torques to be applied, to a specific gradient. In the event of failure of a local brake control unit 118, 120, 122 or 124, the deceleration request for the remaining wheel brakes that are still functioning is to be so formed that the vehicle remains controllable on operation of the brakes. For example, in the event of failure of a front wheel brake, the build-up of force at the remaining, intact wheel brakes should not take place too quickly in order that the yawing moments that occur can be controlled by corresponding reactions by the driver.

The extent to which the gradient is limited is dependent on the functional status of all the local brake control units 118, 120, 122 and 124, or on the information as to which local brake control units 118, 120, 122 and 124 have the ACTIVE status. The ACTIVE status means in this case that the wheel brake 104, 106, 108 and 110 in question is working properly and is ready for use. The limiting of the increase in block 414 will be significantly greater in the event of failure (functional state ERROR) of a wheel brake 104 or 106 of the front axle of the vehicle than will be the case in the event of failure of a wheel brake 108 or 110 of the rear axle of the vehicle. By contrast, if all the wheel brakes 104, 106, 108, 110 are available, the increase limiting function 414 is deactivated. Finally, in the arrangement 400 of FIG. 4 too, a clamping force $F_{SP,\,Request}$ [VL, VR, HL, HR] to be applied by the wheel brakes 104, 106, 108 and 110 is determined in function block 416 from the increase-limited brake force FB determined in block 412.

The controller arrangement shown in FIG. 4 can be implemented both by the central brake control unit 102 and, according to another embodiment in the fallback level operating mode, by the local brake control units 118, 120, 122 and 124. In the case of implementation of the controller arrangement in the central control unit 102, the clamping force $F_{SP,\ Request}$ [VL, VR, HL, HR] to be applied is determined for each functioning wheel brake 104, 106, 108 and 110 and transmitted as control information to the respective local brake control unit 118, 120, 122 and 124 via the first data connection 154.

By contrast, in the case of implementation in a local brake control unit 118, 120, 122 or 124, only the clamping force $F_{SP,\ Request}$ [VL, VR, HL, HR] to be applied for the respective wheel brake 104, 106, 108 or 110 is determined and used for controlling the corresponding actuator 126, 128, 130, 132.

Furthermore, it is also possible in the event of failure of one of the local brake control units 118, 120, 122 or 124 that the central brake control unit 102 determines only the vehicle deceleration request $Z_{Request}$ and transmits it to the remaining local brake control units 118, 120, 122 and 124. The local brake control units 118, 120, 122 and 124 are then configured to determine the clamping force $F_{SP,\ Request}$ [VL, VR, HL, HR] to be applied for the associated wheel brake 104, 106, 108 and 110 from the vehicle deceleration request $Z_{Request}$ in the way described hereinbefore.

The foregoing embodiments have been shown and described for the purposes of illustrating the structural and functional principles of the present invention, as well as illustrating the methods of employing the embodiments and are subject to change without departing from such principles. Therefore, this invention includes all modifications encompassed within the scope of the following claims.

The invention claimed is:

1. A brake system for a motor vehicle comprising:
    a plurality of electromechanical wheel brakes, wherein the wheel brakes each have a local brake control unit;
    a brake operating unit;
    a central brake control unit directly connected to the brake operating unit and to the local brake control units via a first data connection;
    wherein the brake operating unit is directly connected to the local brake control unit of at least one wheel brake via a second data connection;
    wherein in a normal operating moved the central brake control unit determines at least one brake demand based on first operating information received via the first data connection, and transmits control signals corresponding to the brake demand to the local brake control units;
    wherein in a fallback operating mode at least one of the local brake control units actuates a respective at least one wheel brake based on second operating information received via the second data connection; and
    wherein one of the local wheel brake control unit is directly connected to the brake operating unit, and wherein the local brake control unit transmits the second operating information received from the brake operating unit to the other local brake control units via a third data connection.

2. The brake system as claimed in claim 1, wherein the local brake control units of the wheel brakes are configured to exchange at least one of the second operating information and determined wheel speed information with each other via the third data connection.

3. The brake system as claimed in claim 1, wherein the local brake control units of the wheel brakes are each connected to wheel speed sensors of wheels associated with the wheel brakes.

4. The brake system as claimed in claim 1, wherein the first operating information is determined independently of the second operating information.

5. The brake system as claimed in claim 1, wherein the brake operating unit has at least two signal outputs, wherein a first signal output is connected to the first data connection and a second signal output is connected to the second data connection.

6. The brake system as claimed in claim 1, wherein the central brake control unit is connected to a vehicle bus, wherein brake demands received from the vehicle bus are taken into account by the central brake control unit in the determination of the control signals for the local brake control units.

7. The brake system as claimed in claim 1, wherein at least one local brake control unit is directly connected to a vehicle bus.

8. The brake system as claimed in claim 1, wherein the brake system has a primary power supply and a secondary power supply which is independent of the primary power supply.

9. The brake system as claimed in claim 1, wherein at least one subset of the plurality of wheel brakes implements a parking brake function, and wherein in the fallback operating mode the local brake control units activate a parking brake function when one of: a driver is detected leaving the motor vehicle, an ignition of the motor vehicle is deactivated, and a second parking brake operating device is activated.

10. The brake system as claimed in claim 1, wherein in the normal operating mode the central brake control unit determines based on the brake demand at least one of: braking torques and clamping forces to be applied by each of the wheel brakes, and wherein the control signals transmitted to the local brake control units contain the determined braking torques and clamping forces for the wheel brake associated with each local brake control unit.

11. The brake system as claimed in claim 1, wherein in the normal operating mode the central brake control unit determines based on the brake demand a desired deceleration of the motor vehicle that is to be applied by the wheel brakes, wherein the control signals transmitted to the local brake control units contain the desired deceleration, and wherein the local brake control units determine at least one of a braking torque and a clamping force for implementing the desired deceleration.

12. The brake system as claimed in claim 1, wherein in the fallback operating mode the local brake control units determine from the second operating information at least one of: a braking torque to be applied by the wheel brake associated with the respective local brake control unit and a clamping force to be applied.

13. The brake system as claimed in claim 1, wherein a predefined distribution of a braking force necessary for implementing a brake demand between the wheel brakes is considered in determination of at least one of braking torque to be applied and clamping force to be applied.

14. The brake system as claimed in claim 1, wherein, at least one of: an increase in the desired deceleration of the motor vehicle, an increase in the braking torques, and clamping forces applied by the wheel brakes is limited to a specific gradient when failure of at least one of the local brake control units is detected.

15. The brake system as claimed in claim 14, wherein the gradient is dependent on the position in the motor vehicle of the wheel brake associated with the failed local brake control unit.

16. A method of operating a brake system for a motor vehicle comprising:
receiving first operating information in a central brake control unit directly connected to a brake operating unit and to a plurality of local brake control units via a first data connection, wherein one of the local wheel brake control units is directly connected to the brake operating unit;
determining at least one brake demand with the central brake control unit from the first operating information when in a normal operating mode;
transmitting control signals corresponding to the brake demand to a plurality of local brake control units each associated with one of a plurality of wheel brakes when in normal operating mode;
receiving second operating information in at least one of the plurality of local brake control units via a second data connection between the brake operating unit and the plurality of local brake control units when in a fallback operating mode; and
actuating the wheel brakes based on one of the control signals when in the normal operating mode and the second operating information when in the fallback operating mode; and
transmitting the second operating information received from the brake operating unit to the other local brake control units via a third data connection.

17. A brake system for a motor vehicle comprising:
a plurality of electromechanical wheel brakes, wherein the wheel brakes each have a local brake control unit;
a brake operating unit;
a central brake control unit directly connected to the brake operating unit and to the local brake control units via a first data connection,
wherein the brake operating unit is directly connected to the local brake control unit of at least one wheel brake via a second data connection;
wherein in a normal operating mode the central brake control unit is configured with instructions for;
receiving first operating information via the first data connection;
determining at least one brake demand from the first operating information; and
transmitting control signals corresponding to the brake demand to the local brake control units; and
wherein in a fallback operating mode the local brake control units are configured with instructions for;
receiving second operating information via the second data connection; and
actuating at least one wheel brake based on the second operating information; and
transmitting the second operating information received from the brake operating unit to the other local brake control units via a third data connection.

\* \* \* \* \*